(12) United States Patent
Somatomo et al.

(10) Patent No.: US 7,524,578 B2
(45) Date of Patent: Apr. 28, 2009

(54) BATTERY COMPRISING A FLANGE FORMED AT A PERIPHERAL EDGE AND A PROTECTION CIRCUIT ATTACHED TO THE FLANGE

(75) Inventors: Yoshiki Somatomo, Kyoto (JP); Osamu Watanabe, Toyonaka (JP); Masatoshi Tanaka, Toride (JP)

(73) Assignee: Hitachi Maxell, Ltd., Ibaraki-Shi (JP)

( * ) Notice: Subject to any disclaimer, the term of this patent is extended or adjusted under 35 U.S.C. 154(b) by 400 days.

(21) Appl. No.: 10/482,701

(22) PCT Filed: Jul. 5, 2002

(86) PCT No.: PCT/JP02/06870

§ 371 (c)(1),
(2), (4) Date: Jan. 2, 2004

(87) PCT Pub. No.: WO03/007401

PCT Pub. Date: Jan. 23, 2003

(65) Prior Publication Data

US 2004/0180260 A1    Sep. 16, 2004

(30) Foreign Application Priority Data

Jul. 9, 2001    (JP)    ............................. 2001-208463
Aug. 22, 2001    (JP)    ............................. 2001-252160
Jun. 25, 2002    (JP)    ............................. 2002-184042

(51) Int. Cl.
*H01M 2/08*    (2006.01)
*H01M 2/04*    (2006.01)

(52) U.S. Cl. .................. 429/174; 429/175; 429/176
(58) Field of Classification Search .......... 429/174–176
See application file for complete search history.

(56) References Cited

U.S. PATENT DOCUMENTS 6,368,744 B1    4/2002    Hatazawa et al.
6,451,474 B1 *  9/2002    Kozu et al. .................. 429/100

(Continued)

FOREIGN PATENT DOCUMENTS

EP    1033766 A1    9/2000

(Continued)

OTHER PUBLICATIONS

Partial Translation of JP2(1990)-129665U (1 pg.).

(Continued)

*Primary Examiner*—Mark Ruthkosky
*Assistant Examiner*—Karie O'Neill
(74) *Attorney, Agent, or Firm*—Birch, Stewart, Kolasch & Birch, LLP

(57) ABSTRACT

A battery can 2 is composed of a can body 3 having a concave portion 31 for accommodating an electrode body 5, and a metal cover 4 for sealing an opening end of the concave portion 31 of the can body 3. The can body 3 is formed in a plate shape by subjecting a metal plate to shallow drawing. A flange 32 is provided at a peripheral edge portion of the opening end of the can body 3, which is bonded to be integrated with the metal cover 4 to keep an air-tight and liquid-tight state in the concave portion 31.

12 Claims, 10 Drawing Sheets

U.S. PATENT DOCUMENTS

| | | | |
|---|---|---|---|
| 6,572,998 B2 | 6/2003 | Kageyama | 429/56 |
| 6,780,544 B2 * | 8/2004 | Noh | 429/303 |

FOREIGN PATENT DOCUMENTS

| | | | |
|---|---|---|---|
| EP | 1071147 A1 | | 1/2001 |
| EP | 1 089 362 A1 | | 4/2001 |
| JP | 62-55865 | | 3/1987 |
| JP | 62-55866 | | 3/1987 |
| JP | 62-55867 | | 3/1987 |
| JP | 1-320753 | | 12/1989 |
| JP | U2-129665 | | 10/1990 |
| JP | 7-211300 | | 8/1995 |
| JP | 10-284047 A | | 10/1998 |
| JP | 11-031486 A | | 2/1999 |
| JP | 11-162436 | | 6/1999 |
| JP | 11-185714 | | 7/1999 |
| JP | 11-185820 | | 7/1999 |
| JP | 2000-156208 A | | 6/2000 |
| JP | 2000-260402 | | 9/2000 |
| JP | 2000-315483 | | 11/2000 |
| JP | 2001-52659 | | 2/2001 |
| JP | 2001052659 A | * | 2/2001 |
| JP | 2001-68077 | | 3/2001 |
| JP | 2001-93497 | | 4/2001 |
| JP | 2001-167744 | | 6/2001 |
| JP | 2001167744 A | * | 6/2001 |
| JP | 2001-250517 A | | 9/2001 |
| KR | 2000-5813 | | 4/2000 |

OTHER PUBLICATIONS

Patent Abstracts of Japan; Publication No. 62055865A dated Mar. 11, 1987 (1 pg.).

Patent Abstracts of Japan; Publication No. 62055866 dated Mar. 11, 1987 (1 pg.).

Patent Abstracts of Japan; Publication No. 62055867 dated Mar. 11, 1987 (1 pg.).

Patent Abstracts of Japan; Publication No. 01320753 dated Dec. 26, 1989 (1 pg.).

Patent Abstracts of Japan; Publication No. 2001-052659 dated Feb. 23, 2001 (1 pg.).

Patent Abstracts of Japan; Publication No. 07211300 dated Aug. 11, 1995 (1 pg.).

Patent Abstracts of Japan; Publication No. 11162436 dated Jun. 18, 1999 (1 pg.).

Patent Abstracts of Japan; Publication No. 11185714 dated Jul. 9, 1999 (1 pg.).

Patent Abstracts of Japan; Publication No. 2000-315483 dated Nov. 14, 200 (1 pg.).

Patent Abstracts of Japan; Publication No. 2001-093497 dated Apr. 6, 2001 (1 pg.).

Patent Abstracts of Japan; Publication No. 2001-068077 dated Mar. 16, 2001 (1 pg.).

Patent Abstracts of Japan; Publication No. 2000-260402 dated Sep. 22, 2000 (1 pg.).

Translation of PCT International Preliminary Examination Report dated Jul. 9, 2003, 9 pages.

* cited by examiner

BATTERY COMPRISING A FLANGE FORMED AT A PERIPHERAL EDGE AND A PROTECTION CIRCUIT ATTACHED TO THE FLANGE

TECHNICAL FIELD

The present invention relates to a battery suitable for use as a power source of small electronic equipment such as portable electronic equipment, and in particular, to a configuration of a thin battery.

BACKGROUND ART

Batteries used as power sources of electronic equipment have, for example, a cylindrical shape or a prismatic shape. In a cylindrical battery, a metal can deep-drawn to a cylindrical shape (cylindrical drawing) is used, and in a prismatic battery, a metal can deep-drawn to a prismatic shape (prismatic drawing) is used.

On the other hand, in small portable electronic equipment such as a portable information terminal requiring thinness, a relatively thin battery is used. This kind of thin battery is classified into the following types.

(1) A thin battery in which a metal can (deep-drawn can) subjected to the above-mentioned deep-drawing is used, and a metal cover is fitted to an opening of the metal can, followed by welding (e.g., see a conventional prismatic non-aqueous electrolyte secondary battery described in JP 11(1999)-185820 A).

(2) A thin battery using a laminate, in which a metal foil such as an aluminum foil and resin are stacked, as an outer member so as to set the entire thickness small.

(3) A thin battery in which a metal can (shallow-drawn can) subjected to shallow-drawing, such as a lunch box, is used, and a metal cover is fitted to an opening of the metal can, followed by welding (e.g., see a non-aqueous electrolyte solution secondary battery described in JP 11(1999)-185820 A).

In recent years, as seen from the spread of the above-mentioned portable information terminal, there is a strong demand for small and light-weight electronic equipment. Along with this, there also is an increasing demand for thinness of a battery to be mounted on the electronic equipment.

However, a conventional thin battery has a prismatic shape or an elliptically cylindrical shape. Therefore, in order to attach such a battery to equipment or a resin pack (battery pack) to be mounted on the equipment, it is necessary to provide a battery chamber or fix the battery at a predetermined position with a double-faced tape or an adhesive. When the battery chamber is provided, the thickness of the equipment is increased by the thickness of the battery chamber. When the battery is fixed with an adhesive, an increase in thickness of the equipment can be avoided; however, it is difficult to separate the battery for disposal, which is likely to have detrimental effects in modern time as recycling is important.

Furthermore, the conventional thin battery configuration as described in the above (1) to (3) cannot sufficiently meet the demand for further thinness. Alternatively, even if a battery can be made thinner, its strength may not be sufficient, inconvenience is likely to occur in the course of production, it is not easy to set the battery on equipment, etc. Thus, various problems occur.

More specifically, in the battery described in the above (1), a deep-drawn can is used as a battery can, so that there is a predetermined limit to the size to be formed. For example, the thinnest can has a thickness of about 3 mm, and it is impossible or very difficult to obtain a can with a thickness of about 3 mm or less by the current deep-drawing technique. Therefore, in order to obtain such a thin battery can, a stacked material such as a laminate as described above cannot help being used as a battery outer member. In this case, although the thinness of the laminate can be ensured, the strength of the laminate with respect to sticking and bending is smaller than that of a metal can, and furthermore, there is a possibility of swelling of a battery and leakage of liquid.

Furthermore, even if a metal can with a thickness of 3 mm or less can be formed, a deep-drawn can has the following problems.

(A) As the thickness of a metal can is decreased, the width of an opening thereof (opening width in a thickness direction of the can) is decreased, whereby it becomes difficult to insert an electrode in the metal can.

(B) Terminals are attached to attachment holes provided at a metal cover for sealing an opening of a can, via an insulating packing (gasket) made of resin. When the width of the opening becomes narrow, the insulating packing is placed doser to an opening edge. Therefore, when the metal cover is fitted to the opening and bonded thereto by laser welding or the like, the insulating packing is likely to be melted due to welding heat between the metal cover and the can.

(C) For deep-drawing, only an extendable material having a required extensibility is used. Therefore, the kind of metal to be formed is limited, and the hardness of metal to be formed is small. Therefore, a deep-drawn can is weak to the swelling of a battery. Thus, materials that have a large hardness (i.e., that are hard), light weight and strength cannot be used even if desired.

On the other hand, a battery using a shallow-drawn can described in the above (3), more specifically, a battery as described in, for example, JP 11(1999)-185820 A can avoid most of the above-mentioned problems in the battery using a deep-drawn can. However, such a battery also has the following problems.

(a) For example, a peripheral edge of the maximum opening of a can is provided with a cover having the same size as that of the peripheral edge, and the vicinity of the peripheral edge of the maximum opening is welded. Therefore, welding heat is likely to be transmitted to an electrode body (electrode element) in a can and components placed near the welded portion, which may have thermal influence.

(b) In the case where a cover is attached by crimping an outer periphery of the cover and the peripheral edge of an opening (i.e., by seaming), instead of welding, productivity is decreased compared with the case using welding, and there may be a possibility of leakage of liquid from the connected portion between the outer periphery of the cover and the peripheral edge of the opening.

(c) A battery has a simple prismatic shape although it is thin. Therefore, in order to provide a protection circuit required in a secondary battery, it is necessary to separately keep or provide a space for the protection circuit or a base for attachment thereof.

(d) It is necessary to provide a battery chamber for attaching a battery to equipment or a resin pack (battery pack) or to fix a battery at a predetermined position with a double-faced tape or an adhesive. Thus, there are problems similar to those in the case of a prismatic or cylindrical thin battery as described above.

SUMMARY OF THE INVENTION

Embodiments of the present invention provide a battery with a novel configuration that can solve the above-mentioned possible problems in terms of a shape, attachment, strength, productivity, and the like in thinning of a battery.

One embodiment of the present invention relates to a battery including a can body having a concave portion for accommodating an electrode body and a metal cover for sealing the opening end of the concave portion of the can body, which is composed as follows. The can body constituting a battery can has a plate shape formed by subjecting a metal plate to shallow drawing, and a peripheral edge of the opening end of the can body is provided with a flange capable of keeping the inside of the concave portion of the can body in an air-tight and liquid-tight state by being bonded to be integrated with the metal cover. In the concave portion of the can body, an electrode body in which a positive electrode and a negative electrode are stacked with a separator interposed therebetween and an electrolyte solution are accommodated, and the metal cover is bonded to be integrated with the flange of the can body under this condition, whereby the opening end of the concave portion of the can body is sealed.

As means for bonding the can body so as to be integrated with the metal cover, there is a method for bonding the metal cover to the flange portion of the can body by adhesion with resin or laser welding. However, considering various kinds of factors such as productivity or cost, adhesion with resin is desirable.

Examples of the material constituting the can body and the metal can include an iron plate, a nickel plate, an aluminum plate, an alloy plate thereof (i.e., an iron alloy plate, a nickel alloy plate, an aluminum alloy plate, an iron-nickel alloy plate, an iron-aluminum alloy plate, a nickel-aluminum alloy plate), a magnesium alloy plate, a stainless steel plate, a rolled steel plate plated with nickel, and a stainless steel plate plated with nickel. These metal plates may be used alone or in combination. In the case of placing importance on strength and light weight, it is preferable to use a metal plate made of an aluminum alloy having Hv (Vickers hardness) of 70 or more, which has high strength and light weight, and a metal plate made of a magnesium alloy. Furthermore, in the case of placing importance on resistance to corrosion with respect to an electrolyte solution, it is preferable to use a rolled steel plate or a stainless steel plate plated with nickel. Furthermore, regarding the metal cover, the same material as that of the can body is used on the bonded surface side with respect to the can body, and a clad material (for example, nickel clad material obtained by stacking nickel) that is a stacked material excellent in strength and lightness can be used on the opposite side surface.

In order to suppress the expansion of the electrode body and the swelling of the battery can in the thickness direction due to an increase in an internal pressure of the battery, it is desirable that the metal cover and one surface (bottom surface) of the can body placed so as to be opposed to the metal cover are formed respectively in a convex shape toward an inside of the battery, and a deformation amount in a projection direction at a center of the convex shape is 0.05 to 0.3 mm. When the projection amount is smaller than this, the effect of preventing the swelling of the battery can is poor. When the projection amount is larger than this, the electrode body is pressed more than necessary, and the capacity of the can is decreased, which is not preferable. Furthermore, in order to exactly suppress or prevent the swelling, it is preferable that a range corresponding to an area of the electrode body to be placed inside is formed in a convex shape.

A part of the can body or a part of the metal cover opposed to the can body may be provided with a cut-in portion formed by press forming, and this portion can be defined as a safety valve that releases an internal pressure of the battery to outside when the internal pressure of the battery increases to a predetermined value or more.

In order to form a base portion or the like for providing a protection circuit in the battery of the present invention, it is desirable that a part of the flange of the can body is formed as a wide flange portion, and its width is set to be larger than that of the remaining flange portion. In other words, it is desirable that the flange is formed on the periphery of the battery can, and the flange width of a part thereof is larger than that of the remaining portion. In this case, how much the width of the wide flange portion is set to be larger than that of the other flange portion is determined in view of the size of the entire battery, the size of the protection circuit, and the like. Generally, the wide portion is set to be 1 mm to 6 mm.

In order to electrically connect the output terminals of a positive electrode and/or a negative electrode to the protection circuit at a shortest distance and simplify the wiring therebetween, the wide flange portion can be provided with output terminals of a positive electrode and/or a negative electrode. Furthermore, the following also is possible: among circumferential surface portions in a thickness direction of the can body (forming side surfaces of the concave portion), a circumferential surface portion on a side where the wide flange portion is positioned is provided with a lead portion of one of the output terminals of a positive electrode or a negative electrode, and the wide flange portion is provided with the other output terminal.

In order to make it unnecessary to separately keep a space and a base for attaching the protection circuit, and facilitate an operation of attaching the protection circuit for fixing, in other words, in order to easily obtain a thin battery provided with a protection circuit, a protection circuit can be attached to the wide flange portion. In this case, the configuration of attaching a protection circuit may be, for example, as follows.

The protection circuit is incorporated to be modulized in a substrate provided with a plurality of elastic chips having engagement hooks at ends, at predetermined positions on an outer peripheral portion. On the other hand, a peripheral edge of the wide flange portion is provided with a rising portion in a substantially U-shape in a plan view having engagement holes at predetermined positions, formed so as to be bent in a thickness direction of the can body. The engagement hooks of the elastic chips in the protection circuit module are engaged with the engagement holes in the rising portion, whereby the protection circuit module is fixed to the wide flange portion.

The protection circuit is incorporated to-be modulized in a resin molding provided with a pair of elastic chips having hooks at ends, at both side portions, and having grooves in which the wide flange portion is fitted slidably on inner surface sides of the side portions. On the other hand, both the side portions of the wide flange portion are provided with cut-away portions at predetermined positions. When both the side portions of the wide flange portion are fitted in the grooves in the protection circuit module to slide to a predetermined position, the hooks in the protection circuit module are engaged with the cut-away portions in the wide flange portion.

The protection circuit is attached to the wide flange portion and an outside thereof is covered with a metal (e.g., aluminum) case, and under this condition, the metal case is welded to the wide flange portion.

According to one embodiment of the present invention, the can body is a plate-shaped shallow-drawn can, and a peripheral edge of the opening end of the can body is provided with a flange capable of keeping the inside of the concave portion of the can body in an air-tight and liquid-tight state by being bonded to be integrated with the metal cover. Therefore, as means for facilitating the attachment/detachment operation to equipment, the flange can be used. For example, if a guide portion corresponding to the flange of the battery can is formed at a portion of the equipment where the battery is to be attached, merely by inserting the flange to the guide portion so as to allow it to slide, the battery can be attached/detached with respect to the equipment. Thus, a battery can be realized, which is excellent in attachment to the equipment and can be easily separated from the equipment for disposal after use.

The metal cover is bonded to the can body at the flange provided on the peripheral edge of the opening end of the can body. Therefore, the metal cover can be easily attached (e.g., thermal adhesion) to this portion via resin, and a battery can be produced at lower cost compared with a welding method. Furthermore, even in the case of performing laser welding instead of adhesion with resin, the other component materials are isolated to positions relatively away from the welded portion. Therefore, thermal influence on various kinds of components constituting the battery, such as an insulating packing, an electrode, a separator, and the like can be avoided.

According to one embodiment of the present invention, a plate-shaped can body obtained by shallow drawing is used, so that the battery can with a thickness of 3 mm or less can be formed relatively easily. In this case, there is no constraint in terms of materials as in the case of using a deep-drawn can. Therefore, materials having required characteristics can be selected relatively freely from various materials. Thus, a thin battery that can sufficiently withstand sticking, bending, swelling, and the like (in other words, that is excellent in resistance to sticking, resistance to bending, resistance to swelling, and the like) can be relatively easily obtained, although the entire thickness is 3 mm or less.

Furthermore, in the case where the metal cover and one surface (bottom surface) of the can body placed so as to be opposed to the metal cover can are formed respectively in a convex shape toward an inside of the battery, and a deformation amount in a projection direction at a center of the convex shape is 0.05 to 0.3 mm, the expansion of the electrode body and the swelling of the battery can in the thickness direction due to an increase in the internal pressure of the battery can be suppressed.

If a part of the can body or a part of the metal cover opposed to the can body is provided with a cut-in portion formed by press forming as a safety valve, this cut-in portion is broken when the internal pressure of the battery increases to a predetermined value or more, and the internal pressure of the battery is released outside from this portion.

In the case where a part of the flange of the can body is formed as a wide flange portion having a larger width than that of the remaining flange portion, in other words, in the case where a part of the flange provided on the periphery of the battery can is formed as a wide flange portion, the protection circuit can be attached to the wide flange portion. Thus, in the case of providing the protection circuit, it is not necessary to separately keep a space and a base portion therefor. In this case, if one or more of the configurations recited above is adopted, the output terminal can be electrically connected to the protection circuit at a shortest distance, so that wiring therebetween can be simplified.

According to one or more configurations, merely by fitting the protection circuit module in the rising portion provided at the wide flange portion, and engaging the engagement hooks provided at the elastic chips of the protection circuit module with the engagement holes in the rising portion, the protection circuit can be easily fixed to the wide flange portion. Furthermore, according to one or more configurations, both side portions of the wide flange portion are inserted in the grooves provided on inner surfaces of both side portions of the protection circuit module so as to allow the wide flange portion to slide, and the hooks of the elastic chips provided at both side portions of the protection circuit module are engaged with the cut-away portions at both side portions of the wide flange portion, whereby the protection circuit can be easily fixed to the wide flange portion.

In addition, according to one or more configurations, the protection circuit is modulized. According to one or more configurations, the protection circuit attached to the wide flange portion is covered with a metal case. Because of this, the protection circuit is not exposed outside in either case. Thus, the protection circuit can be prevented from being damaged and dust can be prevented from adhering to the protection circuit.

DETAILED DESCRIPTION OF THE INVENTION

Figure 1:
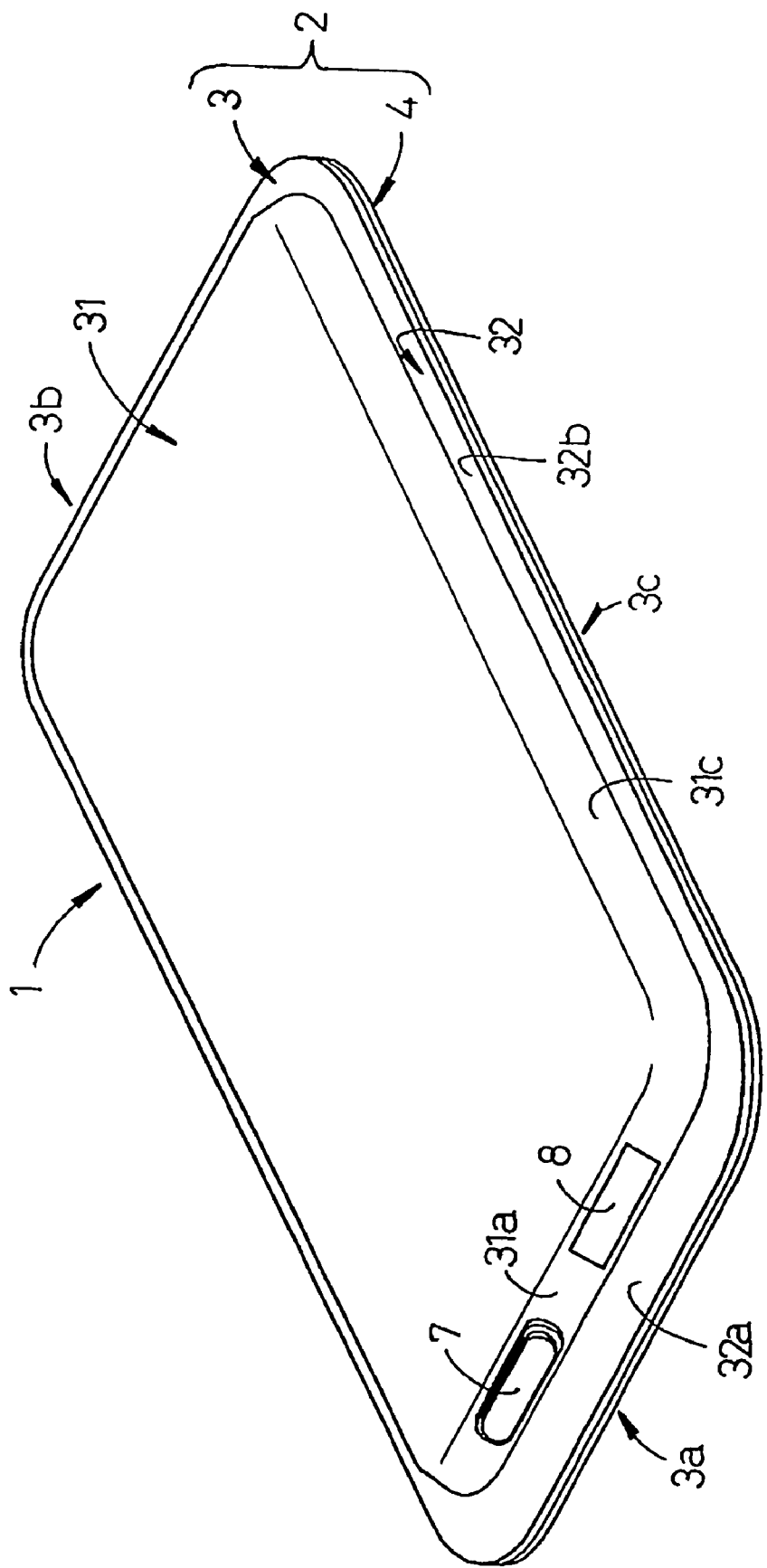
FIG. 1 is an external perspective view showing a battery of the present invention.
Figure 2:
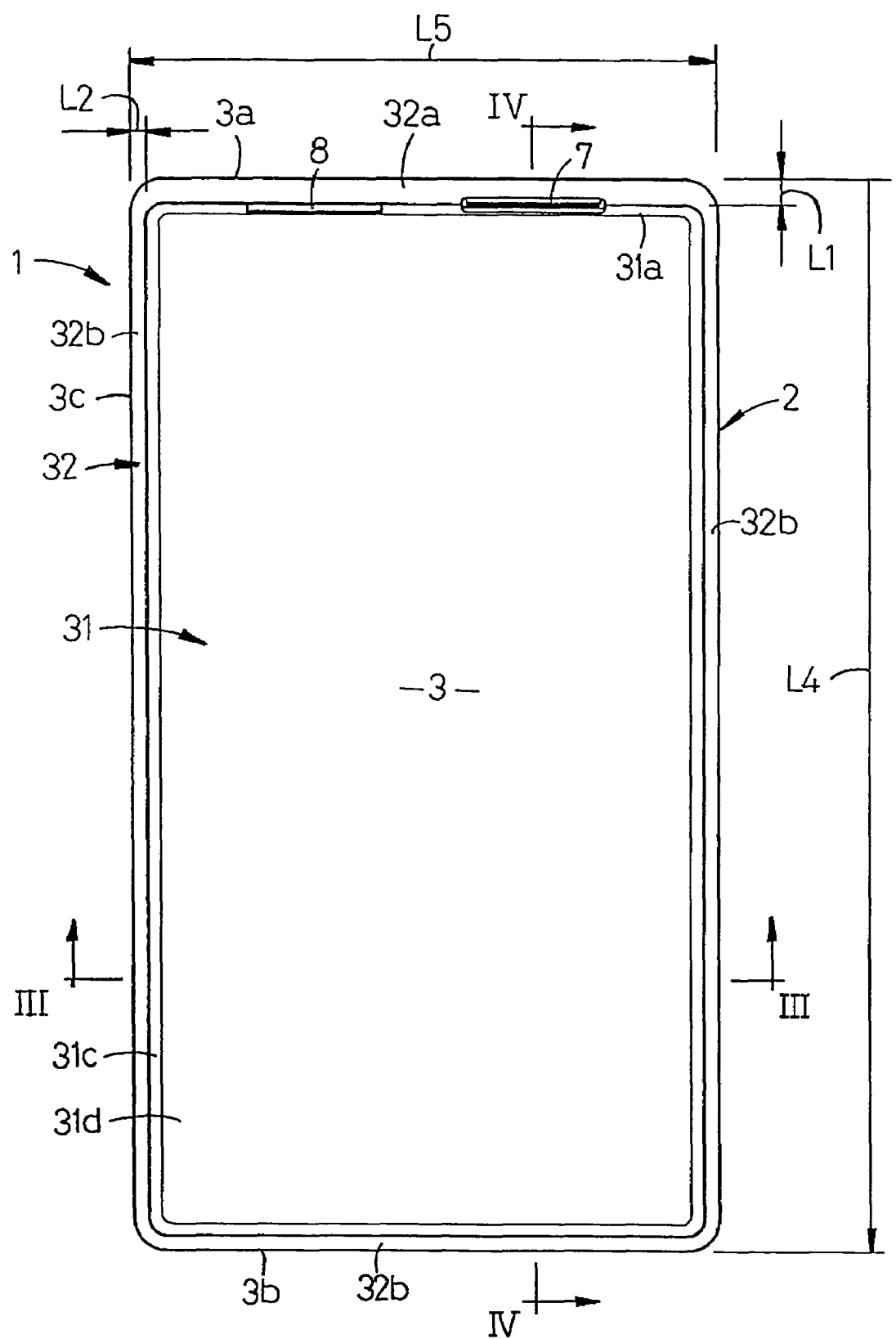
FIG. 2 is a plan view of a battery.

FIGS. 1 to 6 show an example in which one embodiment of the present invention is applied to a prismatic lithium ion secondary battery (hereinafter, referred to as a "battery"). As shown in FIGS. 1 and 2, a battery 1 has a battery can 2 that has a prismatic shape in a plan view (state in FIG. 2) provided with four rounded corners. As shown in FIGS. 1 to 4, the battery can 2 is composed of a can body 3 having a concave portion 31, and a metal cover 4 for sealing an opening end of the concave portion 31 of the can body 3.

The can body 3 is formed in a plate shape by subjecting one metal plate (sheet plate) to shallow drawing, and a flat flange 32 is formed along an entire periphery of a peripheral edge of the opening end. In the flange 32, a width (flange width) L1 of a flange portion (first flange portion) 32a at a first short side portion 3a positioned on an upper end side of the can body 3 in the state shown in FIG. 2 is larger by 1 mm or more than a width (flange width) L2 of a flange portion (second flange portion) 32b at each long side portion 3c positioned on both sides of the can body. In the illustrated example, the first flange portion 32a corresponds to a wide flange portion in the present invention, and L1=2.5 mm and L2=1.5 mm.

Figure 3:
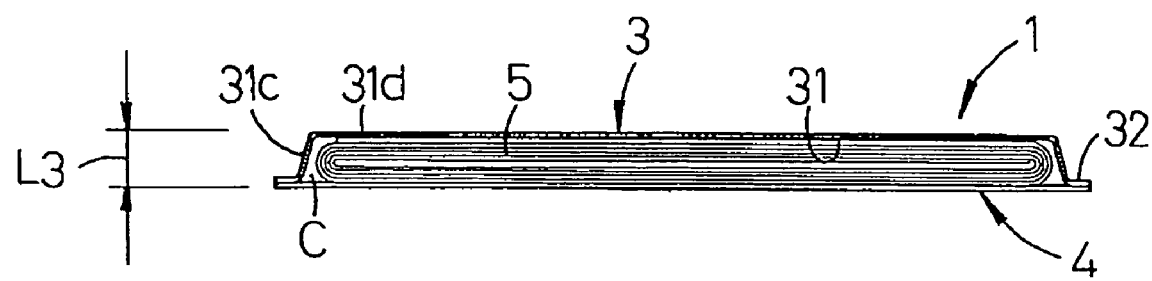
FIG. 3 is a cross-sectional view taken along a line III-III in FIG. 2.
Figure 4:
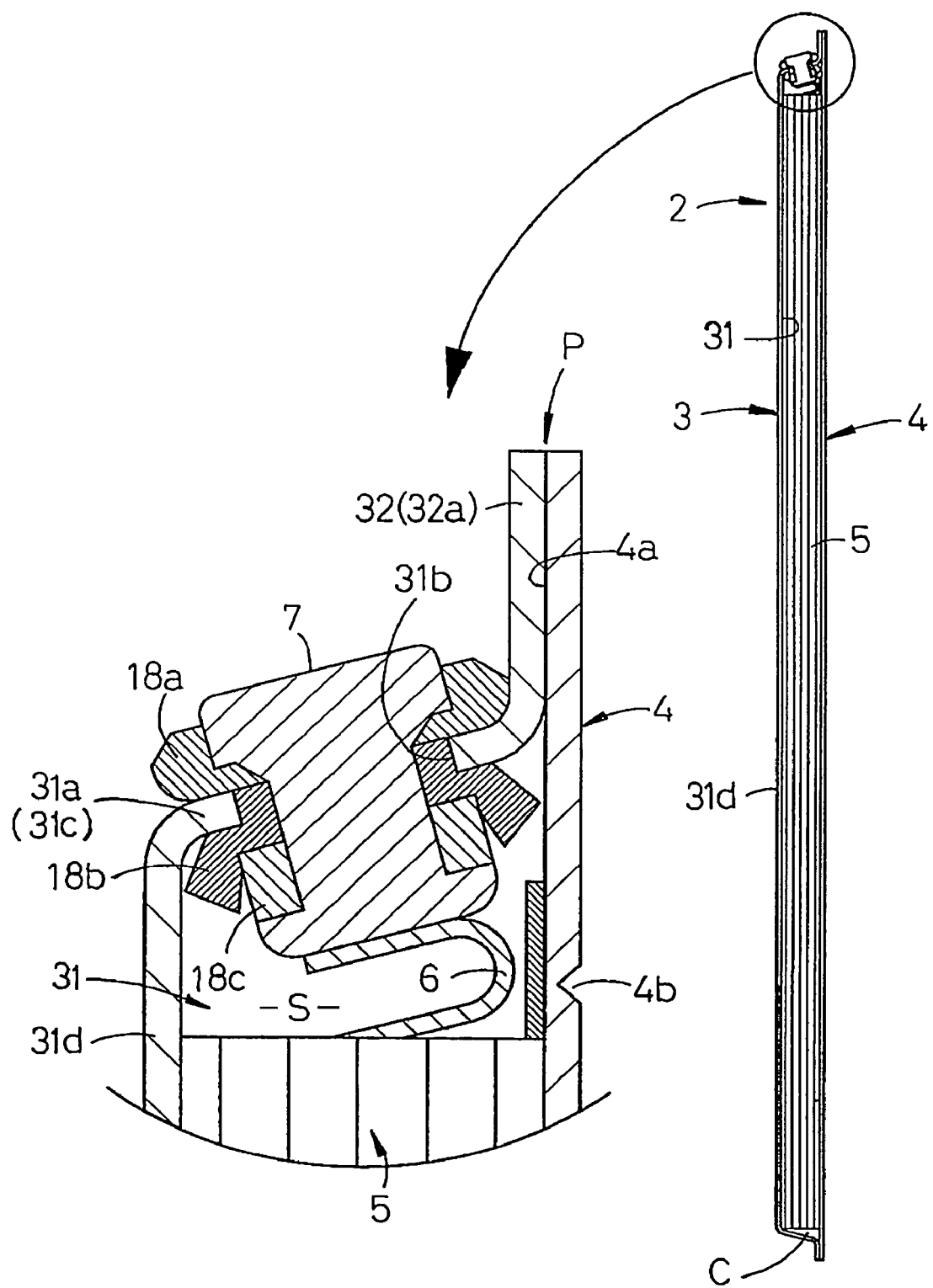
FIG. 4 is a cross-sectional view taken along a line IV-IV in FIG. 2 and a partial enlarged view thereof

As shown in FIGS. 3 and 4, an electrode body 5 and an electrolyte solution (not shown) (e.g., non-aqueous electrolyte solution obtained by dissolving an electrolyte such as $LiBF_4$ in a non-aqueous solvent such as propylene carbonate and ethylene carbonate) and the like are contained in the concave portion 31 of the can body 3 (i.e., in the battery can 2). The electrode body 5 is formed by winding a sheet-shaped positive electrode containing, for example, $LiCoO_2$ as an active material and a sheet-shaped negative electrode containing, for example, graphite as an active material in a spiral shape with a separator placed therebetween, and deforming by crushing the entire body to an elliptical shape in cross-section in accordance with a cross-sectional shape of the concave portion 31 so that the entire body is accommodated in the concave portion 31 of the can body 3. Conducting tabs (only a conducting tab 6 on the negative electrode side is shown in an illustrated example) are led respectively from the sheet-shaped positive and negative electrodes constituting the electrode body 5. The conducting tab (not shown) on the positive electrode side is connected to a predetermined position of an inner surface of the can body 3, and the conducting tab 6 on the negative electrode side is connected to the negative electrode terminal 7 (described later).

At a predetermined position of a circumferential surface portion (hereinafter, referred to as an "upper wall portion") 31a forming a side surface of the concave portion 31 on the first short side portion 3a side (first flange portion 32a side) of the can body 3, a lead portion of an output terminal (hereinafter, referred to as a "negative terminal") 7 of a negative electrode and an output terminal (hereinafter, referred to as a "positive terminal") 8 of a positive electrode are provided. In the battery 1 in the illustrated example, the battery can 2 is on the positive electrode side. Therefore, the positive terminal 8 is composed of one metal plate in an elliptical shape or a prismatic shape, attached to an outer surface of the upper wall portion 31a. Furthermore, as shown in a partially enlarged state in FIG. 4, the lead portion of a negative terminal 7 is composed of an attachment hole 31b passing through the upper wall portion 31a, an insulating packing 18a made of resin placed outside of the upper wall portion 31a, an insulating packing 18b made of rubber placed inside of the upper wall portion 31a and a pressure plate 18c, and the negative terminal 7 fitted in the attachment hole 31b through the insulating packing 18a, 18b and the pressure plate 18c, and by crimpling these components simultaneously to attach them to the upper wall portion 31a, the attachment hole 31b is sealed in an air-tight and liquid-tight state. One end surface of the negative terminal 7 is exposed to the outside of the can body 3, and the other end surface thereof is placed in the concave portion 31, to which the conducting tab 6 led from the sheet-shaped negative electrode is connected.

The circumferential surface 31c including the upper wall portion 31a of the can body 3 forming a side surface of the concave portion 31 may be formed so as to be orthogonal to the flange 32 and a bottom surface 31d of the concave portion 31. As shown in FIGS. 3 and 4, the circumferential surface 31c may be tilted so as to form a predetermined obtuse angle (10° to 30°) with respect to the flange 32 and the bottom surface 31d of the concave portion 31. Because of this, a gap C formed between the inner surface of the can and the electrode body 5 at corners of the battery can 2 is increased to some degree. Therefore, a space that can be used for storing an electrolyte solution is increased by the amount of the gap C, and consequently, an injection amount of the electrolyte solution to the battery can 2 can be increased.

On the other hand, the metal cover 4 is composed of one metal plate obtained by press stamping, and the shape and size of its peripheral edge are set to be the same as those of an outer peripheral edge of the flange 32 in the can body 3. The metal cover 4 is bonded to be integrated with the flange 32 of the can body 3, as shown in FIGS. 3 and 4. The integrally bonded metal cover 4 seals the opening end of the concave portion 31 of the can body 3, whereby the concave portion 31 (battery case 2) is maintained in an air-tight and liquid-tight state.

The metal cover 4 can be bonded to be integrated with to the flange 32 of the can body 3 by laser welding or heat adhesion using resin. In the former case, under the condition that the flange 32 is aligned with the metal cover 4, laser welding is performed in vicinity of the peripheral edges thereof or over the entire outer circumferential portion P of the attached surfaces, whereby the metal cover 4 is bonded to be integrated with the flange 32. Furthermore, in the latter case, the surface of the flange 32 or a peripheral edge portion 4a of the metal cover 4 to be attached to the flange 32 is provided with resin as an adhesive, and the resin is melted temporarily with heat to thermally attach the flange 32 to the metal cover 4, thereby bonding them to be integrated.

For example, as shown in an enlarged state in FIG. 4, a cut-in portion 4b to be a safety valve can be formed by press forming so as to correspond to a space S formed on one-end portion side-of the electrode body 5 in the can body 3. The cut-in potion (safety valve) 4b is broken when a battery internal pressure is increased to a predetermined pressure or more, thereby releasing the battery internal pressure to outside.

In addition, in the battery 1, the metal cover 4 and one surface (surface forming the bottom surface 31d of the concave portion) of the can body 3 positioned so as to be opposed to the metal cover 4 are formed so as to have a slightly convex shape toward the inside of the battery. The deformation amount in the projection direction of a center of the convex portion is set to be in a range of 0.05 to 0.3 mm, whereby the swelling of the battery can 2 in the thickness direction due to the expansion of the electrode body 5 and an increase in a battery internal pressure are suppressed.

Next, the size, material, and the like of a battery and each constituent portion will be described.

A total thickness L3 of the battery 1 can be 3 mm or less, a length L4 of the long side portion 3c can be 65 mm or more, and a length L5 of the first short side portion 3a (which also is applied to the second short side portion 3b) can be 34 mm or more. In the battery in the illustrated example, L3=2.8 mm, L4=67 mm, and L5=35 mm. Although the entire shape of the battery in the illustrated example is prismatic, it may have a disk shape or a circular shape.

For the battery can 2, i.e., the can body 3 and the metal cover 4, for example, an iron plate, a nickel plate, an aluminum plate, an alloy plate of these metals, a magnesium alloy plate, a stainless steel plate, a rolled steel plate plated with nickel, a stainless steel plate plated with nickel, and the like can be used. In the case of placing importance on strength and light weight, it is preferable to use an aluminum alloy or a magnesium alloy having Hv (Vickers hardness) of 70 or more, which has high strength and light weight. Furthermore, in the case of placing importance on resistance to corrosion with respect to an electrolyte solution, it is preferable to use a rolled steel plate or a stainless steel plate plated with nickel. Furthermore, regarding the metal cover 4, the same material as that of the can body 3 is used on the bonded surface side with respect to the can body 3, and a clad material for example, nickel clad material obtained by stacking nickel) that is a stacked material excellent in strength and lightness can be used on the opposite side surface.

The plate thickness of the can body 3 and the metal cover 4 can be set to be 0.2 mm or less, and more preferably about 0.15 mm. In the illustrated example, the plate thickness is 0.15 mm. In the battery 1 of the present invention, the can body 3 is formed by shallow drawing. Therefore, a hard material with high strength as described above can be used. As a result, even if the plate thickness is set to be small, the plate can sufficiently withstand the swelling of a battery.

In the case of thermal adhesion using resin, the thickness of a resin layer after thermal fusion provided between the flange 32 and the metal cover 4 is set to be 0.1 mm or less so as to minimize the transmission of moisture from outside, and preferably about 0.03 to 0.08 mm. Furthermore, the width of the resin layer corresponding to the width direction of the flange 32 is set to be 1 mm or more, and preferably 1.5 mm or more. The width of the resin layer may exceed the width of the flange 32.

With the battery 1 as described above, the flange 32 of the can body 3 bonded to be integrated with the metal cover 4 can be used for facilitating an attachment/detachment operation with respect to equipment (not shown) (e.g., a portable information terminal) to be mounted in the battery 1. For example, a guide portion corresponding to the flange 32 (in particular, the second flange portion 32b positioned on the long side portion 3c side of the can body 3) of the battery can 2 is formed in a portion of the equipment where the battery 1 is to be attached, the flange 32 is inserted to the guide portion and allowed to slide therein, whereby an attachment/detachment with respect to equipment can be performed. Thus, a battery can be realized, which is excellent in attachment to equipment, and can be easily separated from the equipment for disposal after use.

Figure 5:
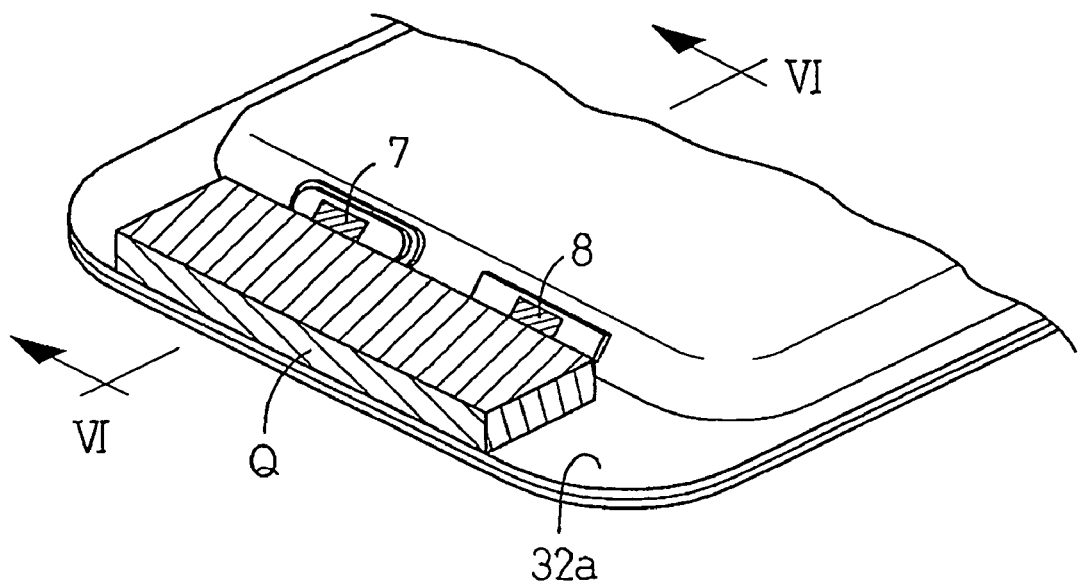
FIG. 5 is a perspective view of the periphery of a flange in a battery, showing an exemplary state in which a protection circuit is provided to the flange.
Figure 6:
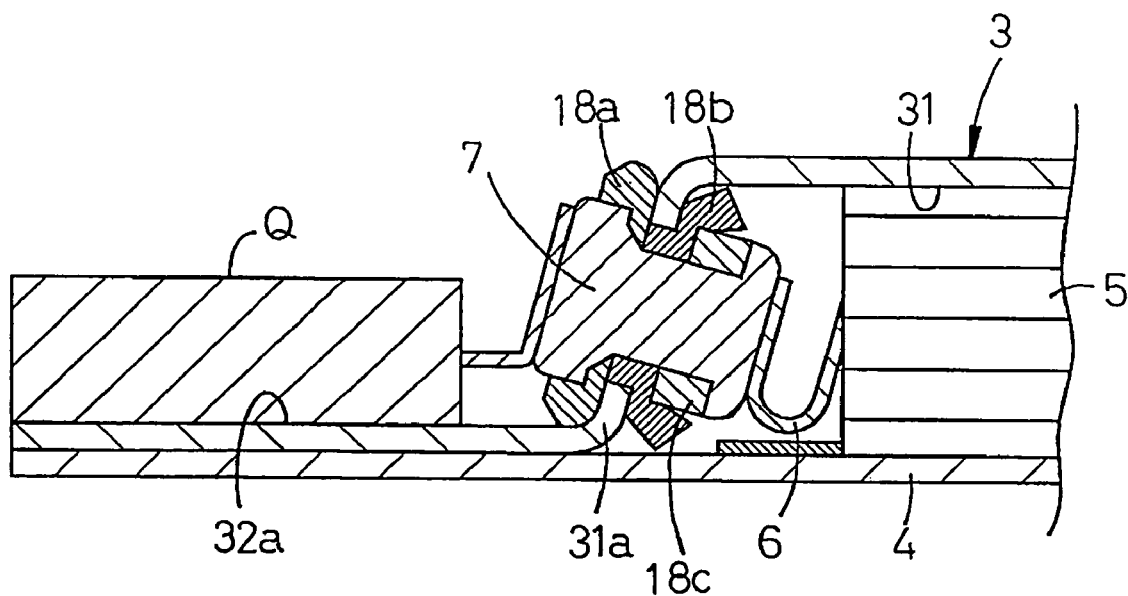
FIG. 6 is an enlarged cross-sectional view taken along a line VI-VI in FIG.5.

Furthermore, a flange width L1 of the first flange portion 32a where the positive terminal 8 and the negative terminal 7 are provided is set to be 6 mm that is larger by 1 mm or more than a flange width L2 of the second flange portion 32b. Therefore, as shown in FIGS. 5 and 6, a protection circuit Q can be provided to the first flange portion 32a, and the positive terminal 8 and the negative terminal 7 can be electrically connected to the protection circuit Q at a shortest distance. Thus, in the case of providing the protection circuit Q, it is not necessary to separately keep a space and a base portion for the protection circuit Q. In addition, wiring between the protection circuit Q and the respective terminals 8, 7 is made simplified.

In the flange 32 provided at the peripheral edge portion of the opening end of the can body 3, the metal cover 4 is bonded to the can body 3. Because of this configuration, for example, even in the case where bonding is performed by laser welding, other components are isolated at a position relatively away from the welded portion. Therefore, thermal influence on various kinds of components constituting the battery 1, such as the insulating packings 18a, 18b, the electrode body 5, a separator (not shown) can be avoided. Furthermore, in the case where the metal cover 4 is thermally bonded to the flange 32 via resin, a battery can be produced at a lower cost compared with the case of using welding.

Furthermore, in the battery 1, a plate-shaped can body 3 obtained by shallow drawing is used, so that the battery can 2 with a thickness of 3 mm or less can be formed relatively easily. In this case, there is no constraint in terms of materials as in the case of using a deep-drawn can. Therefore, materials having required characteristics can be selected relatively freely from various materials as described above. Thus, a battery that can sufficiently withstand sticking, bending, swelling, and the like (in other words, that is excellent in resistance to sticking, resistance to bending, resistance to swelling, and the like) can be relatively easily obtained, although the entire thickness is 3 mm or less.

Next, another exemplary configuration that can be adopted in attaching the protection circuit Q to the battery 1 of the present invention will be described.

Figure 7:
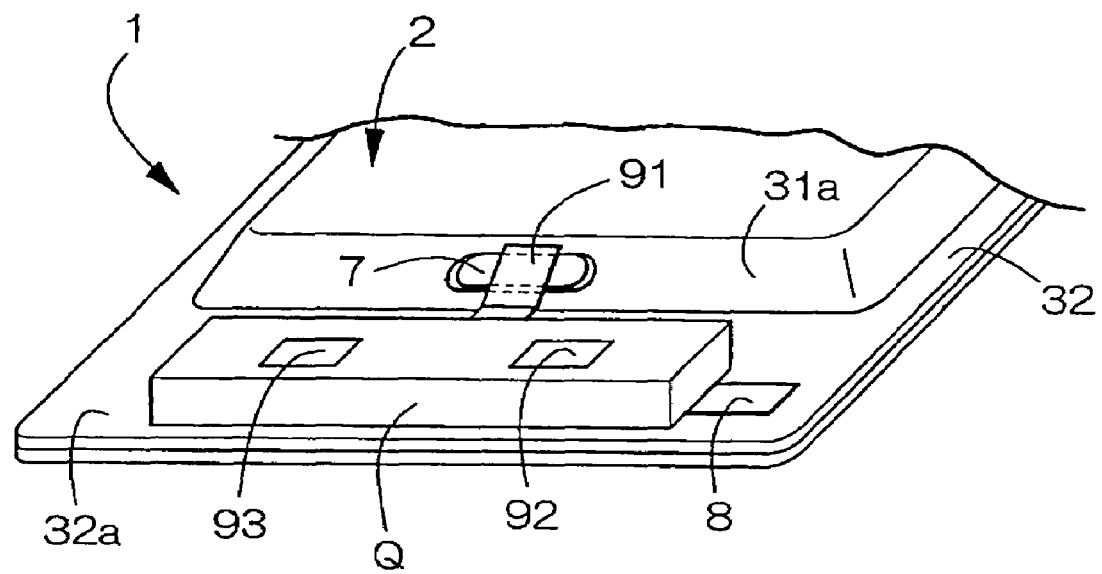
FIG. 7 is a perspective view of the periphery of a wide flange portion (first flange portion) in a battery, showing another example in which a protection circuit is attached to the flange portion.

FIG. 7 shows an example in which the positive terminal 8 and the protection circuit Q are placed on the first flange portion 32a of the battery 1. The protection circuit Q shown in FIG. 7 is electrically connected to the negative terminal 7 provided on the upper wall portion 31a and the positive terminal 8 provided on the first flange portion 32a. Reference numeral 91 denotes a lead for electrically connecting the protection circuit Q to the negative terminal 7. On an upper surface of the protection circuit Q, terminals 92, 93 are provided for external connection of a positive electrode and a negative electrode used for electrically connecting the battery 1 to the external equipment (not shown). The points except for the above are the same or substantially the same as those in the above-mentioned example. Therefore, the corresponding portions are denoted with the same reference numerals, and the description thereof is omitted here (this also is applied to the example described below).

With such a configuration, the protection circuit Q is attached to the first flange portion (wide flange portion) 32a on which the negative terminal 7 is provided. Therefore, the positive terminal 8 and the negative terminal 7 can be electrically connected to the protection circuit Q at a shortest distance. Thus, in the case of providing the protection circuit Q, it is not necessary to separately keep a space and a base portion therefor, and wiring between the protection circuit Q and the respective terminals 8, 7 can be simplified.

Figure 8:
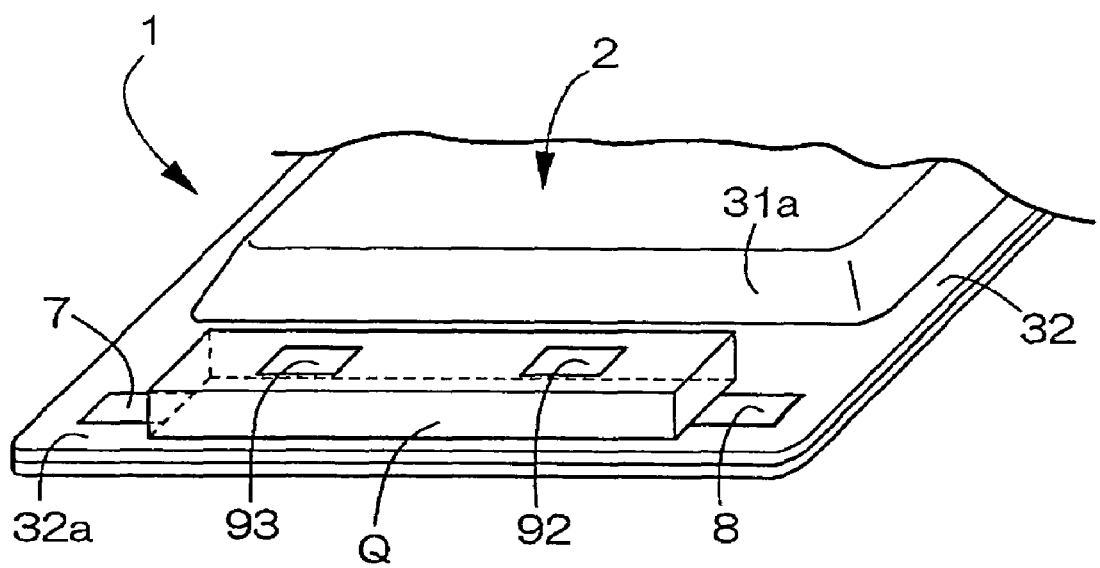
FIG. 8 is a perspective view of the periphery of a wide flange portion in a battery, showing a still another example in which a protection circuit is attached to the flange portion.

FIG. 8 shows an example in which the positive terminal 8 and the negative terminal 7 are provided on the first flange portion (wide flange portion) 32a. In this example, when the protection circuit Q is attached to the first flange portion 32a as shown in the figure, the protection circuit Q is electrically connected to the negative terminal 7 and the positive terminal 8 provided on the first flange portion 32a. According to such a configuration, the protection circuit Q can be connected to the positive terminal 8 and the negative terminal 7 in the battery 1 more easily, and in addition, wiring between the protection circuit Q and the respective terminals 8, 7 can be simplified.

Figure 9:
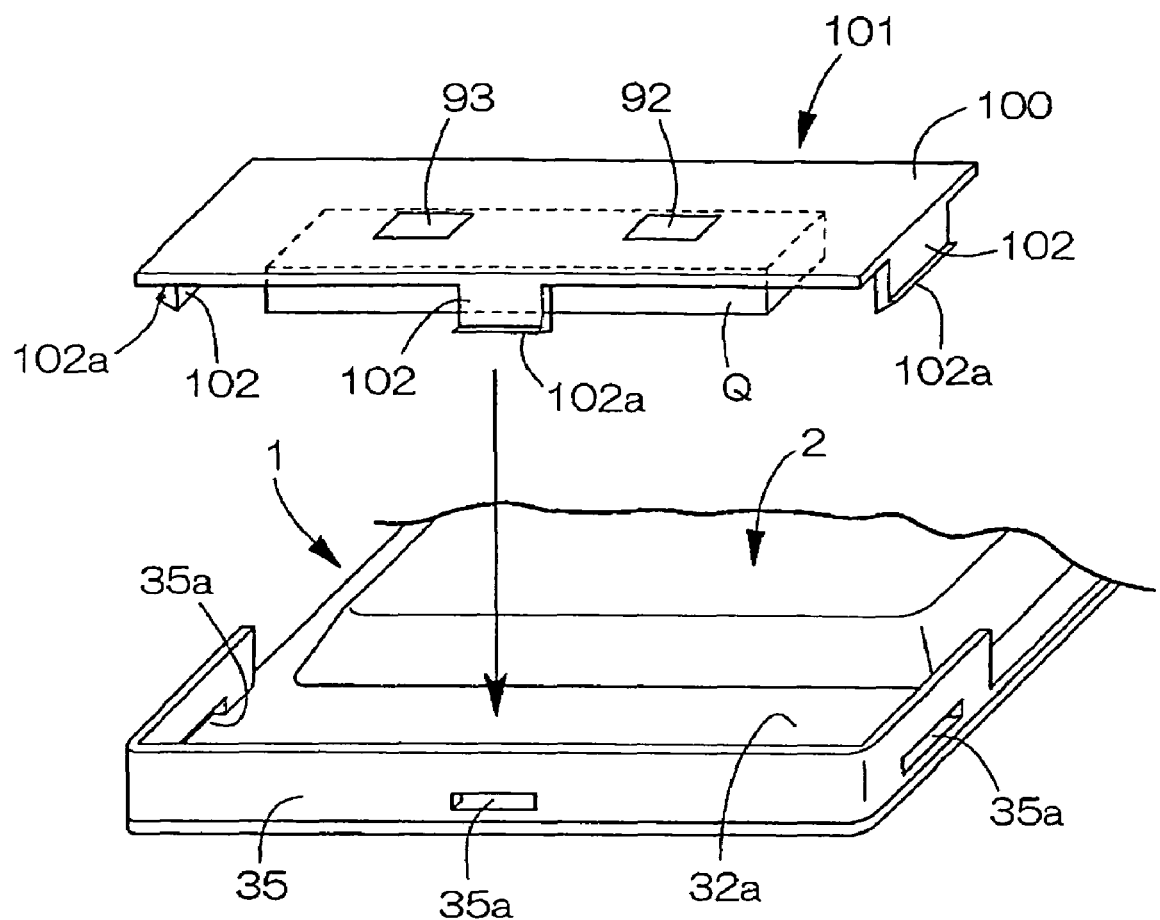
FIG. 9 is a perspective view of a configuration of the periphery of a wide flange portion in a battery and a protection circuit module, showing an example in which the protection circuit module is attached to the flange portion.
Figure 10:
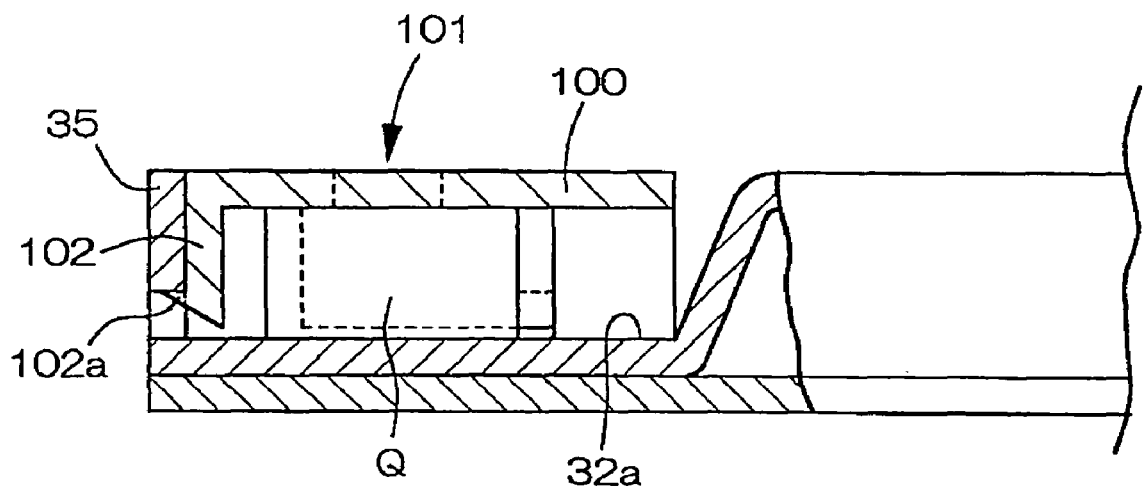
FIG. 10 is a cross-sectional view showing a state in which the protection circuit module is attached to the wide flange portion in the battery shown in FIG. 9.

FIGS. 9 and 10 show an example in which the protection circuit Q is modulized to be attached to the battery 1. In this example, the protection circuit Q is incorporated to one surface (lower surface in the illustrated example) of a substrate 100 to be modulized. On the substrate 100 constituting a protection circuit module 101, a plurality of (3 in the illustrated example) elastic chips 102 are provided on an outer circumferential portion on a surface side where the protection circuit Q is incorporated, and engagement hooks 102a are formed respectively at ends of the elastic chips 102. On the other hand, at a peripheral edge portion of the first flange portion (wide flange portion) 32a of the battery 1, a rising portion 35 substantially in a U-shape in a plan view bent in the thickness direction of the battery can 2 is provided, and engagement holes 35a are formed at predetermined positions on a bottom side of the rising portion 35. As shown in FIG. 9, the protection circuit module 101 is fitted in the rising portion 35, so as to engage the engagement hooks 102a of the protection circuit module 101 with the engagement holes 35a of the rising portion 35, whereby the protection circuit module 101 is fixed to the first flange portion 32a, as shown in FIG. 10.

With such a configuration, the protection circuit module 101 is fitted in the rising portion 35 provided on the first flange portion 32a, and the engagement hooks 102a provided at the ends of the elastic chips 102 are engaged with the engagement holes 35a in the rising portion 35, whereby the protection circuit Q can be fixed easily to the first flange portion 32a. Furthermore, the protection circuit Q is not exposed to the outside since it is modulized. Therefore, the protection circuit Q is prevented or suppressed from being damaged by mistake and dust is prevented or suppressed from adhering to the protection circuit Q.

Figure 11:
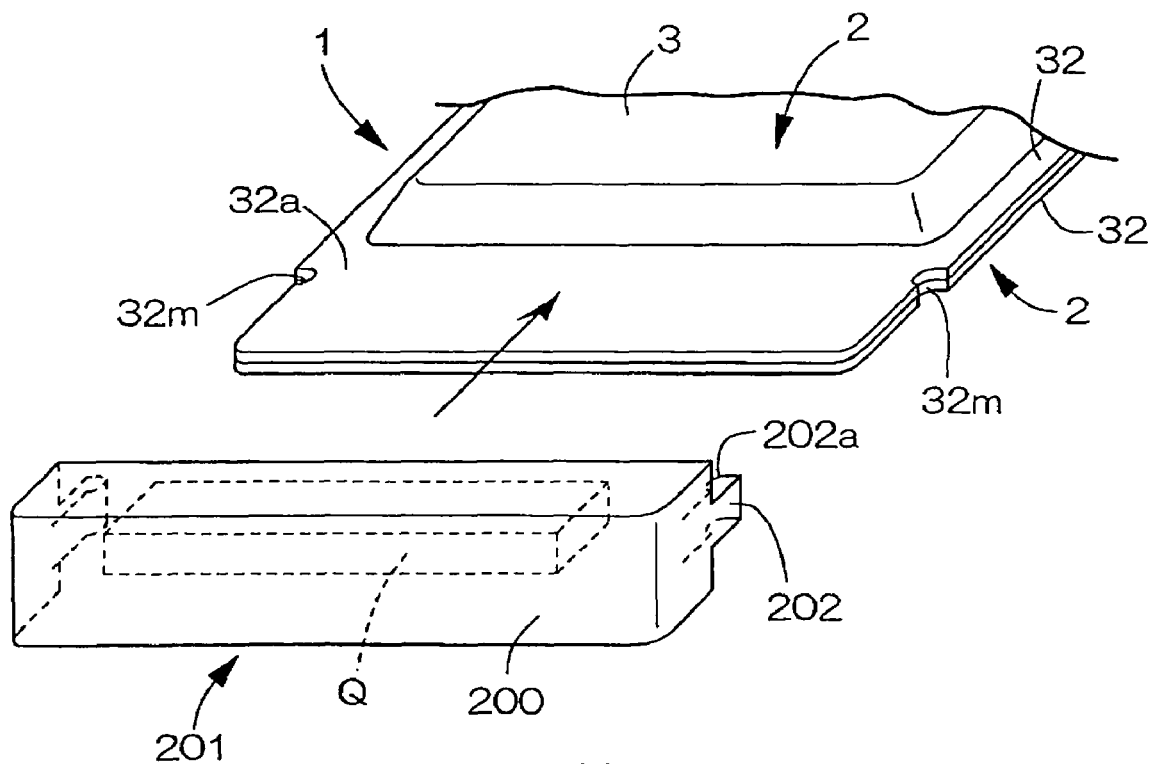
FIG. 11 is a perspective view of a configuration of the periphery of a wide flange portion in a battery and a protection circuit module, showing another example in which the protection circuit module is attached to the flange portion.
Figure 12:
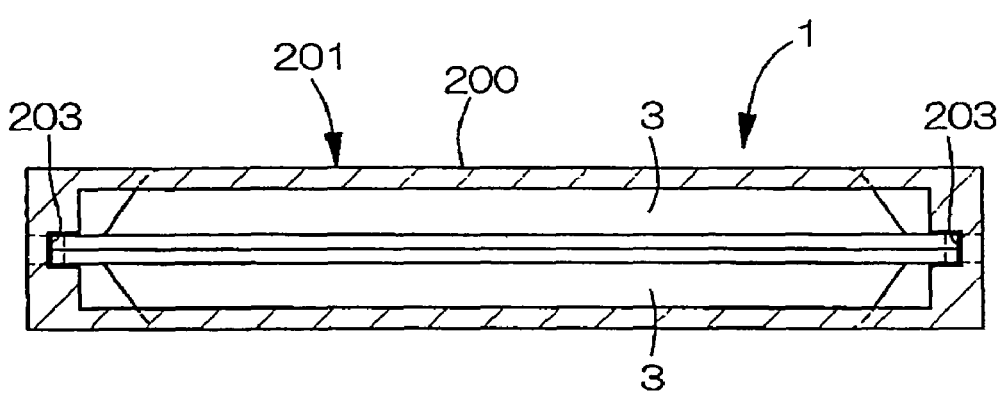
FIG. 12 is a cross-sectional view showing a state in which the protection circuit module is attached to the wide flange portion in the battery shown in FIG. 11.

FIGS. 11 and 12 show another example in which the protection circuit Q is modulized to be attached to the battery 1. In this example, the battery can 2 constituting the battery 1 has a configuration in which the respective flange portions 32 are welded to each other under the condition that opening sides of a pair of can bodies 3 are faced to each other. In other words, in this example, one of a pair of can bodies 3 is used as a metal cover in the present invention, in place of the flat metal cover 4 as shown in FIGS. 3 and 4. In the same way as in the above-mentioned respective examples, the flange portions 32 faced to each other are provided with the first flange portions (wide flange portions) 32a. However, in this example, cut-away portions 32m are provided at predetermined positions on both sides of the first flange portion 32a. On the other hand, the protection circuit Q is incorporated to be modulized in a resin molding 200 at least one surface of which is opened. At both side portions of the resin molding 200 constituting a protection circuit module 201, a pair of elastic chips 202 having hooks 202a at ends are provided. On inner surface sides of both side portions of the resin molding 200, grooves 203, in which both side portions of the first flange portions 32a are fitted slidably, are formed. When both side portions of the first flange portions 32a are fitted in the grooves 203 and slid to a predetermined position, the hooks 202a of the protection circuit module 201 are engaged with the cut-away portions 32m at the first flange portions 32a as shown in FIG. 12, whereby the protection circuit module 201 is fixed to the first flange portions 32a.

With the above-mentioned configuration, both side portions of the first flange portions 32a are allowed to slide while being inserted to the grooves 203 provided on both inner surfaces of the protection circuit module 201, whereby the hooks 202a of the elastic chips 202 provided at both side portions of the protection circuit module 201 are engaged with the cut-away portions 32m on both side portions of the first flange portions 32a. Thus, the protection circuit Q can be fixed to the first flange portion 32a easily. Furthermore, the protection circuit Q is not exposed to the outside since it is modulized. Therefore, the protection circuit Q can be prevented or suppressed from being damaged by mistake and dust can be prevented or suppressed from adhering to the protection circuit Q.

Figure 13:
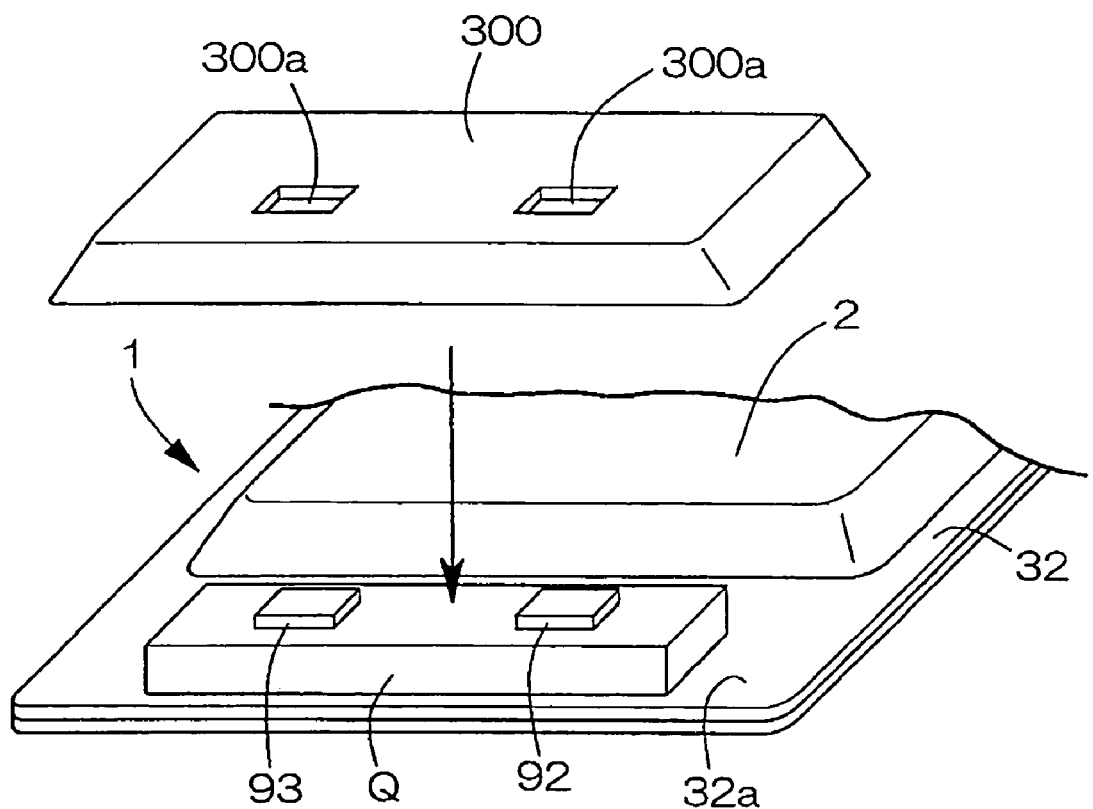
FIG. 13 is a perspective view of the periphery of a wide flange portion showing an example in which a protection circuit is attached to a wide flange portion in a battery and the protection circuit is covered with a case made of metal (aluminum).
Figure 14:
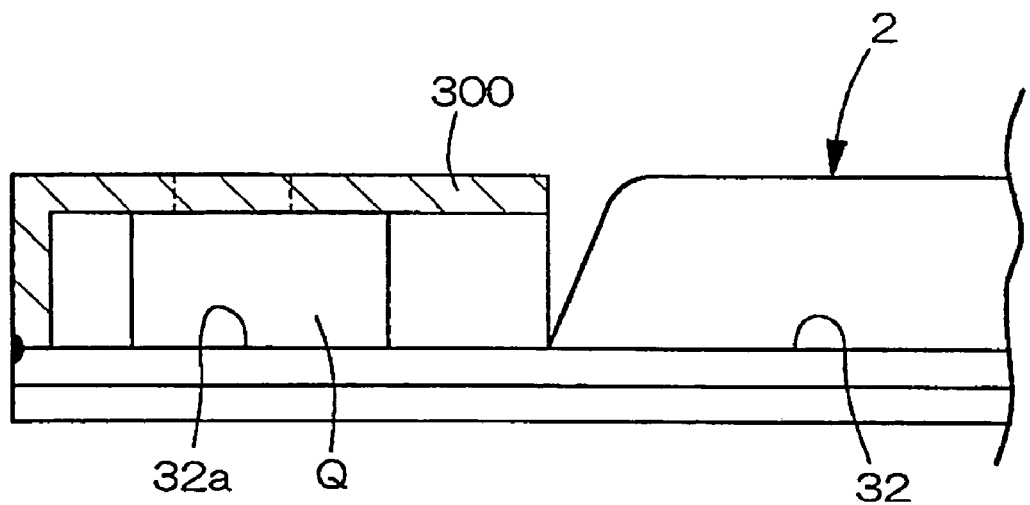
FIG. 14 is a cross-sectional view showing a state in which the protection circuit module shown in FIG. 13 covered with a metal case is welded to a wide flange portion.

FIGS. 13 and 14 show an example in which the protection circuit Q is attached to the first flange portion 32a of the battery 1, the protection circuit Q is covered with an aluminum case (coating) 300, and an peripheral edge on the lower end side of the case 300 is welded to the first flange portion 32a. On an upper surface of the aluminum case 300, two holes 300a are provided. The holes 300a expose terminals 92, 93 for external connection in the protection circuit Q to outside of the case 300, when the protection circuit Q attached to the first flange portion 32a is covered with the case 300 as shown in FIG. 13.

With the above mentioned configuration, the protection circuit Q attached to the wide first flange portion 32a is covered with the aluminum case 300, whereby the protection circuit Q is not exposed to the outside. Thus, the protection circuit Q can be prevented from being damaged by mistake and dust can be prevented from adhering to the protection circuit Q more exactly.

Figure 15:
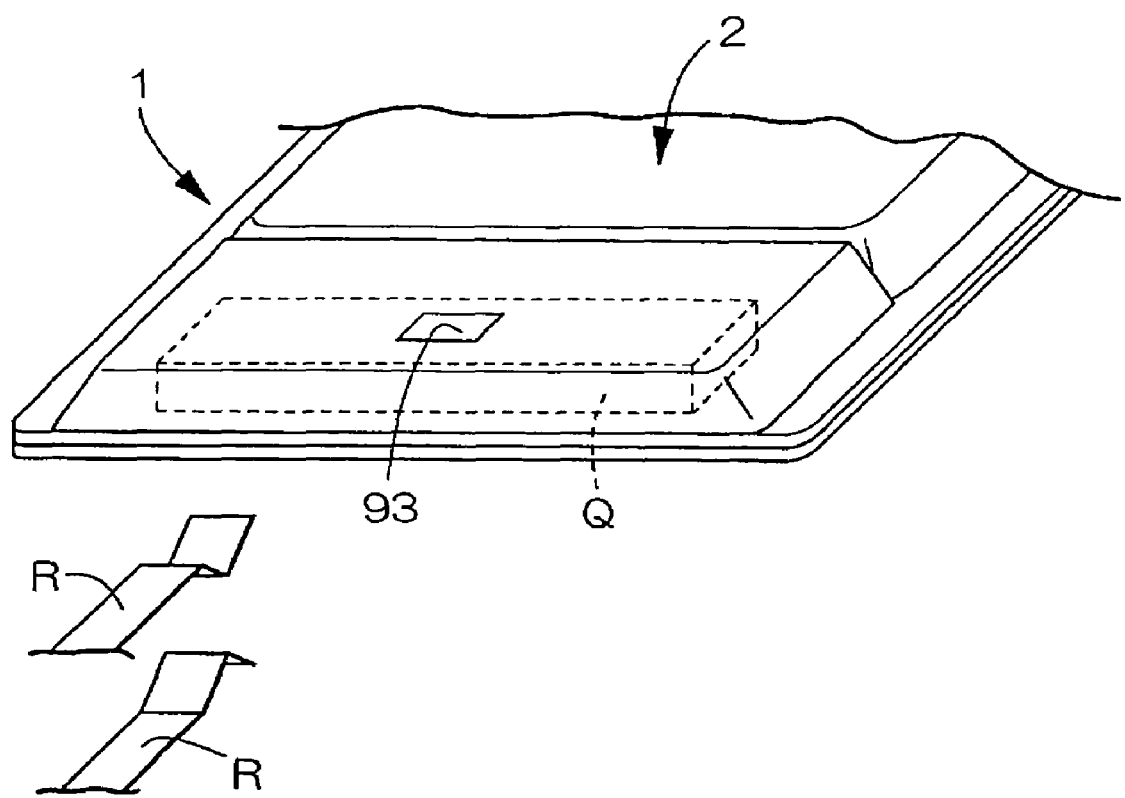
FIG. 15 is a perspective view showing an example in which a battery with a protection circuit module is inserted between a pair of contacts provided at external equipment so that the contacts are electrically connected to each other.

In the examples shown in FIGS. 7, 9, and the like, the terminals 92, 93 for external connection of a positive electrode and a negative electrode are provided on a predetermined surface (surface parallel to the flange portion) in the protection circuit Q and the protection circuit module. However, as shown in FIG. 15, for example, only the terminal 93 for external connection of a negative electrode is provided on a predetermined surface in the protection circuit Q and the protection circuit module, and the terminal 93 for external connection of a positive electrode can be designed so as to be used also in the battery can (positive can) 2. In this case, as shown in FIG. 15, if a pair of upper and lower contacts RR are provided to external equipment, the battery 1 is inserted between the contacts RR so as to bring one of the contacts R into contact with the terminal 93 for external connection of a negative electrode and to bring the other contact R into contact with the battery can 2 that also functions as the terminal for external connection of a positive electrode, external equipment on which a battery is to be mounted can be electrically connected to the battery easily.

As described above, according to embodiments of the present invention, a plate-shaped shallow-drawn can is used for a can body constituting a battery can, and a flange portion to be bonded to be integrated with a metal cover is provided along a peripheral edge of the shallow-drawn can. Therefore, a thin battery can be realized, which is excellent in attachment to equipment for mounting the battery, and in which a protection circuit can be mounted by simple wiring. In this case, if the can body is bonded to be integrated with the metal cover with resin, integration by bonding can be simplified in the course of production, compared with integration by welding. This can reduce a production cost.

Furthermore, even in the case where the can body and the metal cover are bonded to each other by laser welding or the like, welding or the like can be performed at a position relatively away from other component materials. Therefore, thermal influence on various kinds of components constituting a battery, such as an insulating packing, an electrode, and a separator can be avoided.

Furthermore, there is less constraint in terms of a material as in the case of using a deep-drawn can, and a material having required characteristics can be relatively freely selected from various materials. Therefore, a battery that is excellent in resistance to sticking, resistance to bending, resistance to swelling, and the like while having an entire thickness of 3 mm or less can be relatively easily obtained.

In the case where a part of the flange portion of the can body is formed to be wider, an output terminal of a positive electrode and/or a negative electrode or a lead portion thereof can be provided, and a protection circuit can be attached to the wide flange portion. Therefore, the output terminal can be electrically connected to the protection circuit at a shortest distance, which simplifies wiring therebetween.

Furthermore, it is not necessary to separately keep a space and a base for attaching a protection circuit, which is generally required for attaching the protection circuit to a thin battery. Furthermore, in the case where a protection circuit is incorporated to be modulized in a required component, in view of the attachment and the like to the wide flange portion, i.e., a predetermined protection circuit module is used, an attachment operation of the protection circuit to the battery can be simplified further. In addition, a protection circuit can be fixed exactly at a predetermined position, and simultaneously, can be electrically connected to the output terminal easily.

While the invention has been described with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

The invention claimed is:

1. A battery comprising: a can body having a concave portion for accommodating an electrode body, formed by shallow drawing, and a flange formed at a peripheral edge of an opening end; and a metal cover for sealing the opening end of the concave portion of the can body,
    wherein the electrode body in which a positive electrode and a negative electrode are wound in a spiral shape with a separator interposed therebetween, and a non-aqueous electrolyte solution in which an electrolyte is dissolved in a non-aqueous solvent are accommodated in the can body, and
    the can body is bonded to be integrated with the metal cover at the flange of the can body, whereby the electrode body and the nonaqueous electrolyte solution are sealed in the can body,
    the flange is formed in a rectangular shape including four sides, and a flange portion including one of the four sides is a wide flange portion formed so as to have a flange width larger than that of a flange portion including the remaining sides,
    a protection circuit is attached to the wide flange portion, and
    the protection circuit is incorporated to be modulized in a substrate or a resin molding.

2. The battery according to claim 1, wherein the can body is bonded to be integrated with the metal cover by adhesion with resin.

3. The battery according to claim 1, wherein the can body and the metal cover are composed of at least one selected from the group consisting of an iron plate, a nickel plate, an aluminum plate, an alloy plate thereof, a magnesium alloy plate, a stainless steel plate, a rolled steel plate plated with nickel, and a stainless steel plate plated with nickel.

4. The battery according to claim 1, wherein the metal cover and one surface of the can body placed so as to be opposed to the metal cover are formed respectively in a convex shape toward an inside of the battery, and a deformation amount in a projection direction at a center of the convex shape is 0.05 to 0.3 mm.

5. The battery according to claim 1, wherein a part of the can body or a part of the metal cover opposed to the can body is provided with a cut-in portion formed by press forming as a safety valve that releases an internal pressure of the battery to outside when the internal pressure of the battery increases to a predetermined value or more.

6. The battery according to claim 1, further comprising an output terminal attached to the wide flange portion.

7. The battery according to claim 1, wherein among circumferential surface portions in a thickness direction of the can body forming side surfaces of the concave portion, a circumferential surface portion on a side where the wide flange portion is positioned is provided with a lead portion of an output terminal of one selected from a positive electrode and a negative electrode.

8. The battery according to claim 1, wherein the protection circuit is incorporated to be modulized in a substrate provided with a plurality of elastic chips having engagement hooks at ends, at predetermined positions on an outer peripheral portion,
    a peripheral edge of the wide flange portion to which the protection circuit module is to be attached is provided with a rising portion in a substantially U-shape in a plan view having engagement holes at predetermined positions, formed so as to be bent in a thickness direction of the can body,
    and the engagement hooks of the elastic chips in the protection circuit module are engaged with the engagement holes in the rising portion, whereby the protection circuit module is fixed to the wide flange portion.

9. The battery according to claim 1, wherein the protection circuit is incorporated to be modulized in a resin molding provided with a pair of elastic chips having hooks at ends, at both side portions, and having grooves in which the wide flange portion is fitted slidably on inner surface sides of the side portions,
    both the side portions of the wide flange portion are provided with cut-away portions at predetermined positions,
    and when both the side portions of the wide flange portion are fitted in the grooves in the protection circuit module to slide to a predetermined position, the hooks in the protection circuit module are engaged with the cut-away portions in the wide flange portion.

10. The battery according to claim 1, wherein the protection circuit is attached to the wide flange portion and an outside thereof is covered with a metal case, and under this condition, the case is welded to the wide flange portion.

11. The battery according to claim 1, wherein among circumferential surface portions in a thickness direction of the can body forming side surfaces of the concave portion, a circumferential surface portion on a side where the wide flange portion is positioned is provided with a lead portion of a negative terminal of a negative electrode, wherein one end surface of the negative terminal is exposed to an outside of the can body, and the other end surface of the negative terminal is in the concave portion of the can body and wherein the end surface of the negative terminal in the concave portion of the can body is connected to the negative electrode with a conducting tab.

12. The battery according to claim 2, wherein the width of the resin exceeds the width of the flange.

* * * * *